United States Patent [19]

Amelio

[11] Patent Number: 5,779,288
[45] Date of Patent: Jul. 14, 1998

[54] LOW PROFILE LATCH MECHANISM

[75] Inventor: Armand F. Amelio, New Milford, Conn.

[73] Assignee: United Technologies Corporation, Stratford, Conn.

[21] Appl. No.: 118,066

[22] Filed: Sep. 8, 1993

[51] Int. Cl.$^6$ .................................................. F05C 5/04
[52] U.S. Cl. .................. 292/251; 292/256.71; 411/105; 411/262
[58] Field of Search .................. 292/251, 58, 256.71, 292/256.73; 411/103, 105, 262, 108, 109, 910, 999

[56] References Cited

U.S. PATENT DOCUMENTS

| | | | |
|---|---|---|---|
| 2,720,776 | 10/1955 | Eberle | 292/251 X |
| 2,991,904 | 7/1961 | Carideo | 220/44 |
| 3,060,787 | 10/1962 | Kraus et al. | 411/350 |
| 3,093,222 | 6/1963 | Christoffersen et al. | 411/107 X |
| 3,122,012 | 2/1964 | Christopher | 70/140 |
| 3,404,716 | 10/1968 | Cosenza | 411/105 |
| 3,600,912 | 8/1971 | Foreman | 70/251 |
| 3,683,988 | 8/1972 | Carter et al. | 411/105 |
| 3,712,656 | 1/1973 | Godshall | 292/251 |
| 4,016,914 | 4/1977 | Zurko | 411/105 |
| 4,428,609 | 1/1984 | Baehr | 292/251 |
| 4,609,314 | 9/1986 | Metz | 411/105 X |
| 4,863,326 | 9/1989 | Vickers | 411/105 |

FOREIGN PATENT DOCUMENTS

| | | | |
|---|---|---|---|
| 626013 | 7/1949 | United Kingdom | 411/262 |
| 155583 | 3/1954 | United Kingdom | 411/262 |
| 765315 | 1/1957 | United Kingdom | 411/262 |

*Primary Examiner*—Rodney M. Lindsey
*Attorney, Agent, or Firm*—Terrance J. Radke

[57] ABSTRACT

A low profile latch mechanism for an access panel that minimizes external structural discontinuities while concomitantly providing external access to engage and/or disengage the latch mechanism for closing and/or opening of the access panel. The latch mechanism includes an insert member mounted in rotatable combination with the internal surface of the access panel, a captured floating nut mounted in nonrotatable combination with the internal surface of a frame segment, a safety lock member mounted for axial displacement within the captured floating nut, and a removable key member. The removable key member is insertable through an access aperture in the access panel to engage the insert member for rotation thereof to threadingly engage the captured floating nut to close the access panel. The safety lock member is biased to engage the insert member to lock the low profile latch mechanism in the fully engaged state upon removal of the key member. The removable key member is inserted through the access aperture to mechanically disengage the safety lock member from the insert member to initiate the disengagement procedure. Counter-rotation of the key member causes the insert member to threadingly disengage from the capture floating nut, which causes the access panel to be biased to a partially open position wherein the access panel may be fully opened manually.

14 Claims, 6 Drawing Sheets

LOW PROFILE LATCH MECHANISM

The Government has rights in this invention pursuant to Contract No. DAAJ09-91-C-A004 awarded by the Department of the Army.

TECHNICAL FIELD

The present invention relates generally to latch mechanisms for aircraft access panels/doors, and more particularly to a low profile latch mechanism for aircraft, particularly helicopter, access panels/doors that minimizes airframe structural discontinuities.

BACKGROUND OF THE INVENTION

Low radar observability (LO) may be a critical design requirement for certain types of aircraft, e.g., reconnaissance helicopters. To satisfy the LO design requirement, the aircraft is configured and/or fabricated to minimize the radar signature reflected to ground and/or air-based scanning/tracking radars. One method of achieving LO characteristics in aircraft is to minimize abrupt contour changes or structural discontinuities in the aircraft fuselage. Abrupt contour changes/structural discontinuities change the electrical impedance of the aircraft fuselage which increases the cumulative aircraft signature due to reflected radar energy.

External latch mechanisms for securement of aircraft fuselage doors and/or access panels create structural discontinuities which increase the reflected radar signature of aircraft. One prior art solution for minimizing the radar signature of such structural discontinuities includes absorptive coatings applied to the latch mechanism to absorb a portion of incident radar energy. Another solution is to shape the latch mechanism to minimize the amount of radar energy reflected therefrom. While such solutions are generally effective, such solutions tend to increase the overall system cost of the aircraft.

Still another solution is to provide internal latch mechanisms that eliminate external structural discontinuities. Internal latch mechanisms, however, are of limited utility inasmuch as internal access to such latch mechanisms must be available for engagement and/or disengagement thereof. While internal access is possible in some circumstances, the utility of internal latch mechanisms is limited for many applications, e.g., equipment bays, access doors/panels, etc. that must be externally accessible.

A need exists to provide a latch mechanism for aircraft access doors/panels that minimizes external structural discontinuities of the aircraft airframe. Such a latch mechanism should provide external access to engage and/or disengage the latch mechanism to close and/or open the access panel/door. The latch mechanism should be simple to fabricate, assemble, and install, and possess a high degree of reliability.

SUMMARY OF THE INVENTION

A primary object of the present invention is to provide a low profile latch mechanism for an aircraft door/panel that minimizes external structural discontinuities while concomitantly providing external access to engage and/or disengage the latch mechanism wherein the access door/panel may be closed and/or opened.

Another object of the present invention is to provide a low profile latch mechanism for an aircraft door/panel that includes a safety lock member that automatically locks the latch mechanism in the engaged state and which must be unlocked to disengage the latch mechanism.

A further object of the present invention is to provide a low profile latch mechanism for an aircraft door/panel that is easily fabricated, assembled, and installed, and which provides a high degree of reliability.

These and other objects are provided by a low profile latch mechanism for an aircraft access panel/door according to the present invention that includes a threaded insert member, means for mounting the insert member, a captured floating nut having internal threads complementary to the insert member, means for mounting the captured floating nut, a safety lock member, and a removable key member. The insert member is mounted in rotatable combination with the internal surface of the access panel/door utilizing the insert member mounting means. The captured floating nut is mounted in nonrotatable combination with the aircraft airframe utilizing the captured floating nut mounting means.

The safety lock member is mounted within the captured floating nut and axially displaceable with respect thereto. The removable key member has a polygonal-shaped shank that is insertable through an access aperture in the access door/panel to engage and rotate the insert member. The internal mounting of the low profile latch mechanism in conjunction with the polygonal configuration of the removable key member, which allows the access aperture to be minimized, minimizes the structural discontinuities associated with the access door/panel.

The removable key member is insertable through the access aperture to disengage the safety lock member and to engage and rotate the insert member to threadingly engage the captured floating nut for closure of the access panel/door. Upon full threaded engagement of the insert member in the captured floating nut, the key member is removed, causing axial displacement of the safety lock member to engage the insert member to lock the latch mechanism, and concomitantly, the access door/panel.

To open the access door/panel, the removable key member is inserted through the access aperture to unlock the low profile latch mechanism by disengaging the safety lock member from the insert member. The key member is then counter-rotated to threadingly disengage the insert member from the captured floating nut so that the latch mechanism is disengaged wherein the access door/panel may be opened.

BRIEF DESCRIPTION OF THE DRAWINGS

A more complete understanding of the present invention and the attendant features and advantages thereof may be had by reference to the following detailed description of the invention when considered in conjunction with the accompanying drawings wherein.

DETAILED DESCRIPTION OF PREFERRED EMBODIMENTS

Figure 1:
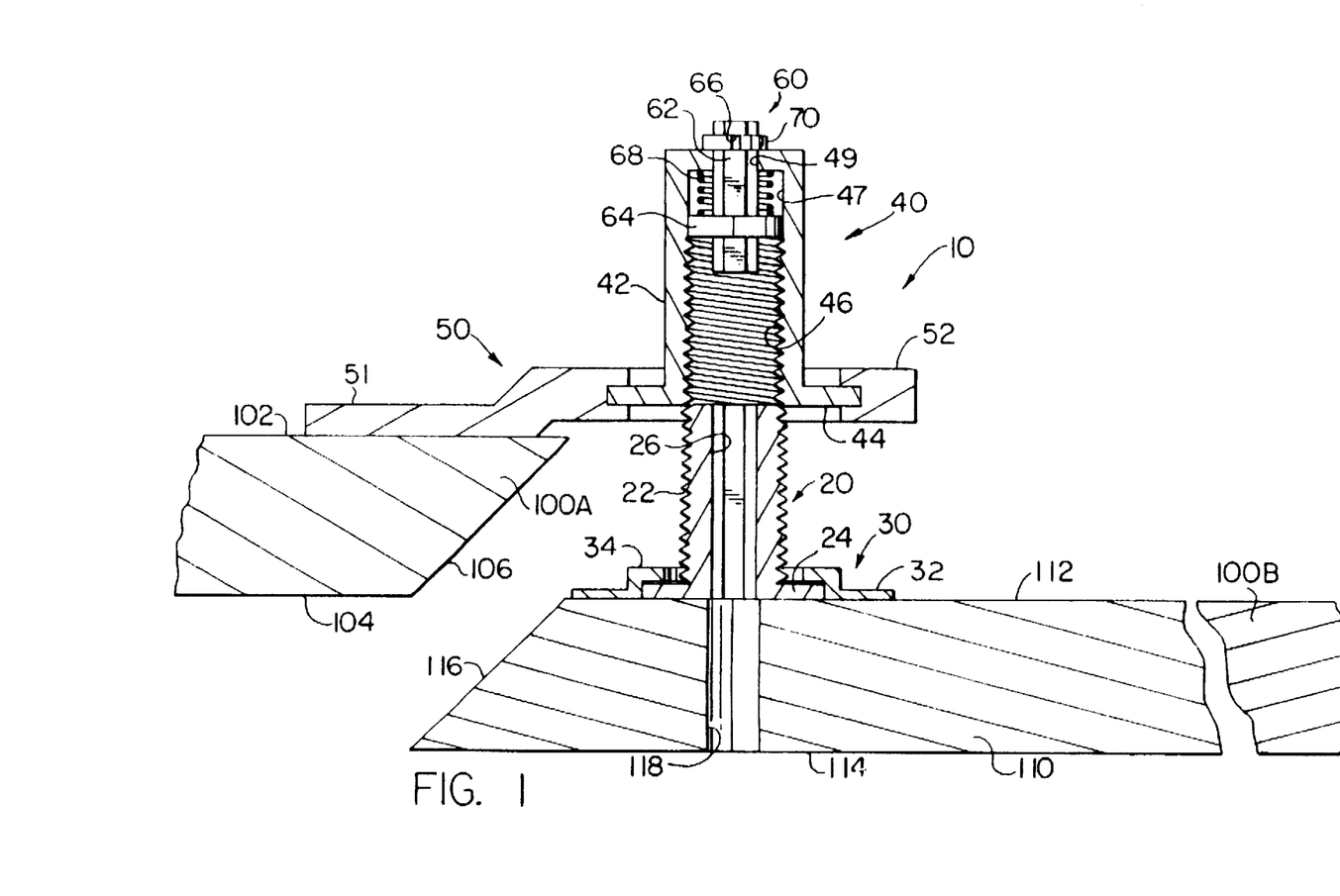
FIG. 1 is a cross-sectional view of one embodiment of a low profile latch mechanism according to the present invention.
Figures 1A, 1B:
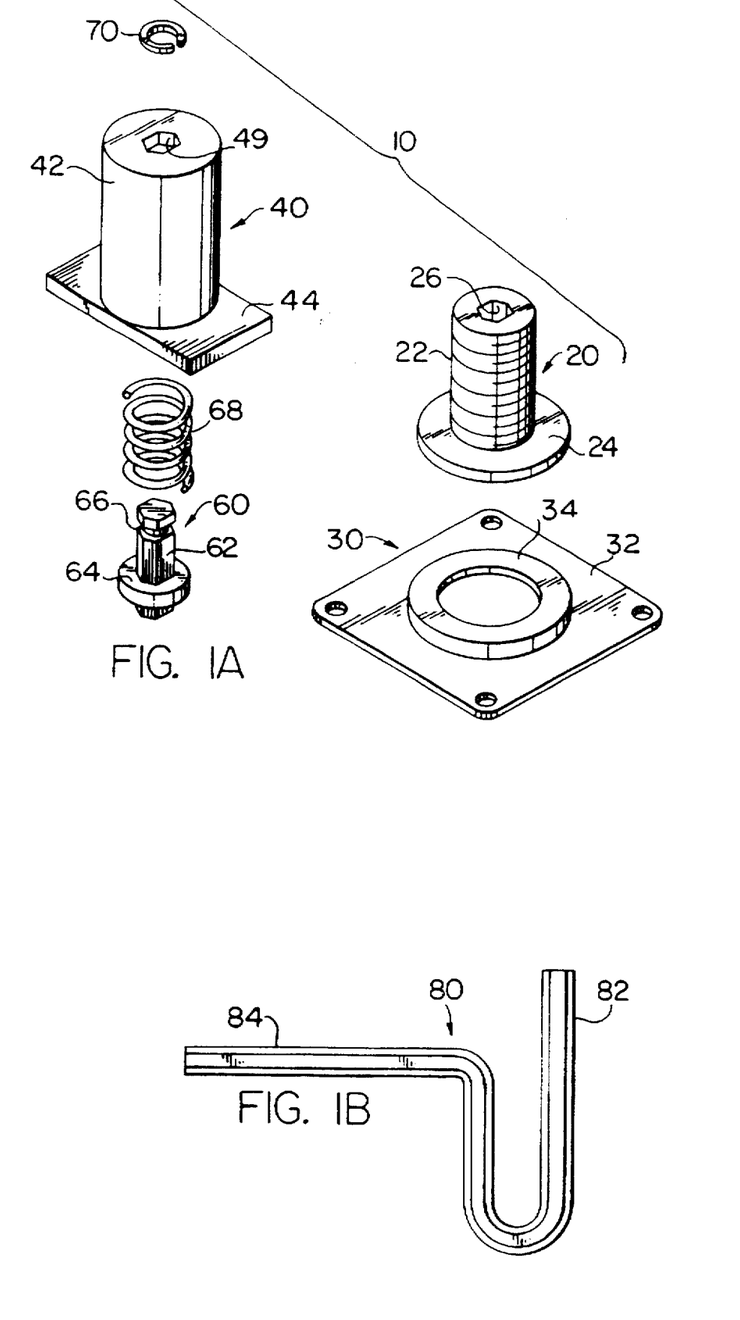
FIG. 1A is an exploded perspective view of the low profile latch mechanism of FIG. 1.
FIG. 1B is a perspective view of a removable key member for the low profile latch mechanism of FIG. 1.

Referring now to the drawings wherein like reference characters identify corresponding or similar elements throughout the several views, FIGS. 1, 1A, 1B illustrate one embodiment of a low profile latch mechanism 10 according to the present invention that includes an insert member 20, an insert mounting bracket 30, a captured floating nut 40, a nut mounting means 50, a safety lock member 60, and a removable key member 80. The latch mechanism 10 minimizes external structural discontinuities of an aircraft access door/panel while concomitantly providing external access to engage and/or disengage the latch mechanism 10 wherein the panel may be closed and/or opened, respectively. The latch mechanism 10 is automatically locked in the engaged state such that the access panel is locked in the closed position. The latch mechanism 10 is readily fabricated and assembled, easily integrated in combination with an airframe, simple to operate, and provides a high degree of reliability.

The aircraft airframe includes a first segment 100A having an internal surface 102, an external surface 104, and a mating edge 106 (illustrated in FIG. 1 as beveled). An access panel 110 includes an internal surface 112, an external surface 114, a mating edge 116 complementary in configuration to the mating edge 106, and an access aperture 118 extending from the external surface 114 to the internal surface 112. As used herein the "panel" terminology also encompasses a door or any other movable member that is used to close off an entrance. The panel 110 is mounted in pivotable combination with a second airframe segment 100B such that the panel 110 may be pivoted with respect to the airframe segment 100B for opening and closure of the access panel 110, i.e., the mating edge 116 of the access panel 110 swings outwardly away from the first airframe segment 100A during the opening procedure and swings inwardly towards the airframe segment 100A during the closing procedure.

The insert member 20 comprises an externally-threared threaded body 22 having a circular flanged head 24 and a polygonal-shaped internal channel 26. The insert mounting bracket 30 is operative to mount the insert member 20 in rotatable combination with the access panel 110 and includes a cylindrical housing 34 and a base plate 32. The insert member 20 is inserted in the mounting bracket 30 which is secured in combination with the internal surface 112 of the access panel 110 by conventional means, e.g., screws, bonding. Securement is effected so that the internal channel 26 is aligned with the access aperture 118 of the access panel 110.

The flanged head 24 of the insert member 20 is restrained by the cylindrical housing 34 and rotatable with respect thereto and the internal surface 112 of the access panel 110. The threaded portion 22 of the insert member 20 extends outwardly from the cylindrical housing 34 as illustrated in FIG. 1.

The captured floating nut 40 is a closed-end cylindrical member 42 having a torque shoulder 44 at the open end thereof. A first internal portion 46 of the cylindrical member 42 adjacent the torque shoulder 44 is threaded while a second internal portion 47 of the cylindrical member 42 adjacent the closed end thereof is smooth. The threads of the first internal portion 46 are complementary with the external threads of the body 22 of the insert member 20. The closed end of the cylindrical member 42 has a polygonal opening 49 formed therethrough.

The nut mounting means 50 for the low profile latch mechanism 10 is a structural bracket having first and second ends 51, 52 that is utilized to mount the captured floating nut 40 in combination with the airframe 10A. The first end 51 is secured to the inner surface 102 of the airframe 100 by conventional means, e.g., screws, bonding. The second end 52 is configured to engage the torque shoulder 44 of the captured floating nut 40 such that the captured floating nut 40 is mounted in nonrotatable combination with the airframe 100A.

The safety lock member 60 comprises a polygonal-shaped body member 62 having a cylindrical centering member 64 secured in combination therewith adjacent one end thereof and an annular groove 66 formed therein adjacent the other end thereof. The safety lock member 60 further includes a bias spring 68 and a snap ring 70. The polygonal-shape of the body member 62 is complementary to the polygonal opening 49 of the cylindrical member 42 and the polygonal-shaped internal channel 26 of the insert member 20.

The bias spring 68 is disposed in combination with the upper portion of the body member 62 to abut against the centering member 64. The body member 62 is inserted within the receptacle member 40 so that the annular groove 66 of body member 62 extends through the polygonal opening 49. The body member 62 is secured in place by inserting the snap ring 70 in the annular groove 66. In this position, the bias spring 68 abuts against the closed end of the cylindrical member 42 and the centering member 64 abuts against and is slidable with respect to the smooth surface 47 of the cylindrical member 42. The biasing force exerted by the bias spring 68 axially displaces the polygonal-shaped body member 62 to a limit defined by the snap ring 70 abutting against the closed end of the cylindrical member 42. During engagement and disengagement of the low profile latch mechanism 10, the centering member 64 is operative to maintain the polygonal-shaped body member 62 in axial alignment with the polygonal-shaped internal channel 26 of the insert member 20.

The removable key member 80 is illustrated in FIG. 1B and comprises a handle 82 and a polygonalshaped shank 84. The polygonal-shape of the shank 84 is complementary to the polygonal-shaped internal channel 26 of the insert member 20. The access aperture 118 of the access panel 110 is sized and has a configuration such that the shank 84 is insertable therethrough and rotatable therein. Preferably, the access aperture 118 has the smallest dimension to achieve such characteristics so as to minimize the structural discontinuity in the external surface 114 of the access panel 110.

As described hereinabove, the internal channel 26 of the insert member 20, the opening 49 in the closed-end cylindrical member 42, the body member 62 of the safety lock member 60, and the shank 84 of the removable key member 80 have a polygonal configuration, e.g., hexagonal, octagonal. The hexagonal configuration is illustrated in the drawings as this is a readily available, standard polygonal configuration. It will be appreciated, however, a more esoteric polygonal configuration may be utilized to limit operational access to the low profile latch mechanism according to the present invention. Since the internal channel 26, the lower portion of the body member 62, and the shank 84 interactively function in combination to provide the characteristics of the low profile latch mechanism 10 described herein, these elements must have complementary polygonal configurations. To simplify the fabrication of the elements of the low profile latch mechanism 10, the upper portion of the body member 62 and the polygonal opening 49 preferably have the same configuration.

To engage and lock the low profile latch mechanism 10 according to the present invention so that the access panel 110 may be locked in the closed position, the access panel 110 is pre-positioned as shown in FIG. 1 so that the externally-threaded body 22 of the insert member 20 engages the lower threaded portion 46 of the captured floating nut 40. The shank 84 of the removable key member 80 is inserted through the access aperture 118 to engage the polygonal-shaped internal channel 26. As the key member 80 is rotated, the insert member 20 is threaded into the captured floating nut 40 due to the interaction between the externally-threaded body 22 and the lower threaded portion 46.

Figure 2:
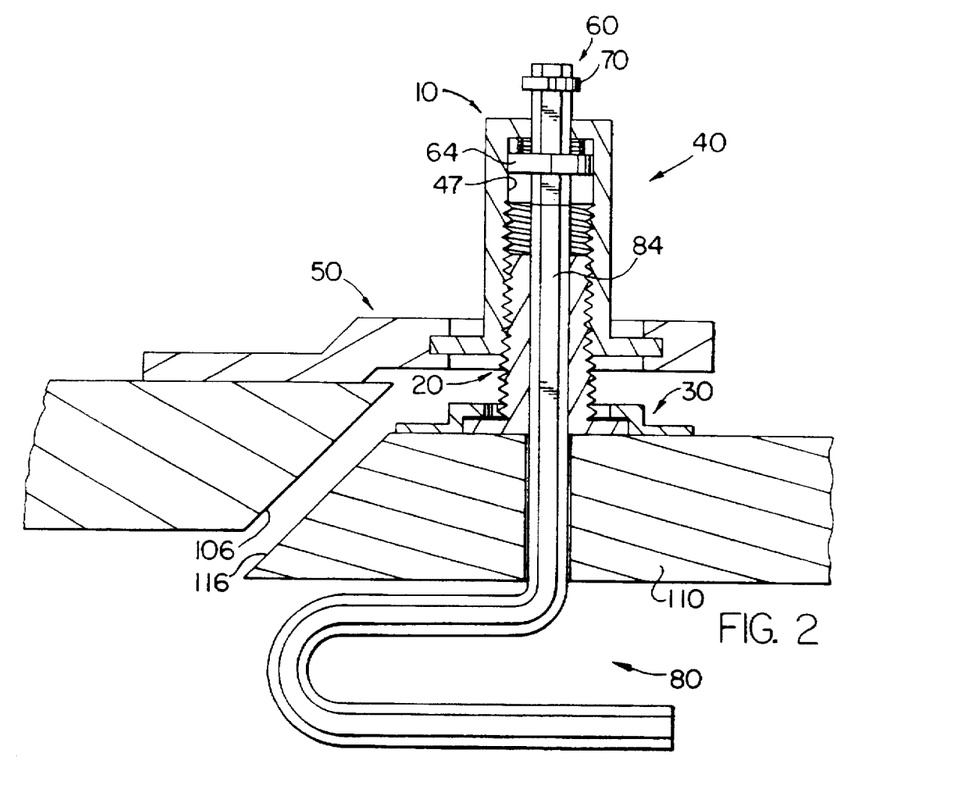
FIG. 2 illustrates the low profile latch mechanism of FIG. 1 partway through the engagement sequence.
Figure 3:
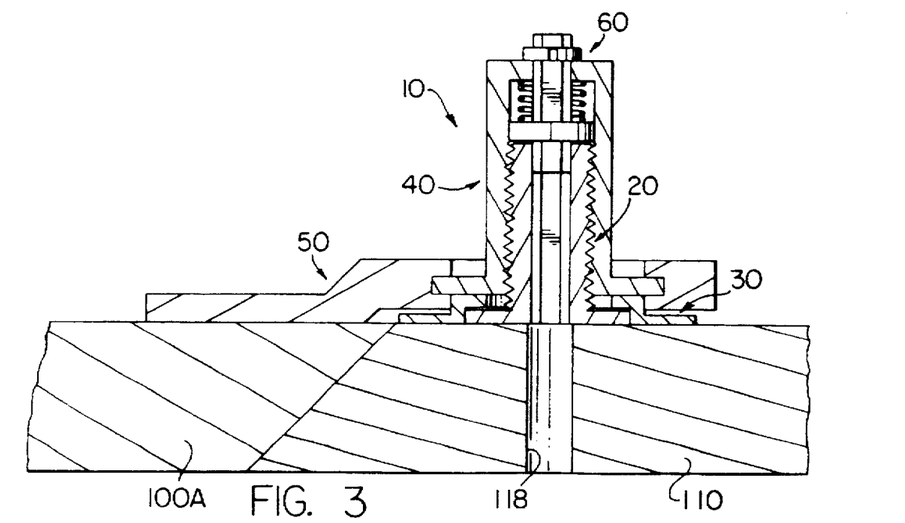
FIG. 3 illustrates the low profile latch mechanism of FIG. 1 in the engaged and locked state.

Continued rotation of the key member 80 causes the end of the shank 84 to engage the safety lock member 60 and axially displace it upwardly along the smooth portion 47 of the captured floating nut 40 as illustrated in FIG. 2. Once the insert member 20 is fully engaged with the captured floating nut 40, the key member 80 is removed. The bias spring 68 exerts a biasing force against the centering member 64 to cause the polygonal-shaped body member 62 to be axially displaced downwardly over the smooth portion 47 so that the portion of the polygonal-shaped body member 62 protruding from the centering member 64 is inserted into the polygonal-shaped internal channel 26 of the insert member 20 as illustrated in FIG. 3, i.e., body member 62 is engaged in internal channel 26. If body member 62 is not aligned with the internal channel 26, engagement will not be achieved. However, since the insert member 20 rotates in relation to the captured floating nut 40, the complementary polygonal shapes of the body member 62 and the internal channel 26 ensure that locking engagement will automatically occur.

The engagement of the body member 62 in the internal channel 26 mechanically locks the insert member 20 in combination with the captured floating nut 40 to preclude counter-rotation of the insert member 20 with respect to the captured floating nut 40. This is the engaged state of the low profile latch mechanism 10 according to the present invention, i.e., the latch mechanism 10 is locked and the access panel 110 is locked in place in the closed position.

To unlock and disengage the low profile latch mechanism 10 to open the access panel 110, the shank 84 of the key member 80 is inserted into the access aperture 118 and the internal channel 26 to mechanically force the safety lock member 60 out of engagement with the insert member 20 to unlock the latch mechanism 10, i.e., unlock the access panel 110. The key member 80 is then counter-rotated to cause the insert member 20 to threadingly disengage from the captured floating nut 40. Once the insert member 20 is threadingly disengaged from the receptacle member 40, the access panel 110 will have been pushed outwardly from the contour defined by the aircraft segments 100A, 100B and may be opened by manual force applied to the mating edge 116 thereof so that the access panel 110 pivots with respect to the airframe segment 100B, thus eliminating the need for external hand holds which are unacceptable for LO requirements.

Figure 4A:
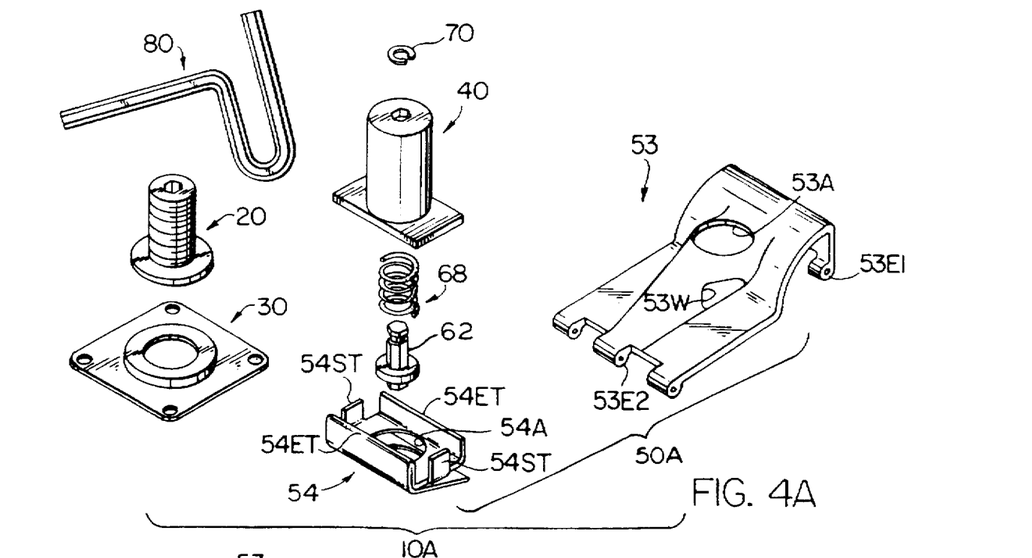
FIG. 4A is an exploded perspective view of another embodiment of a low profile latch mechanism according to the present invention.
Figure 4B:
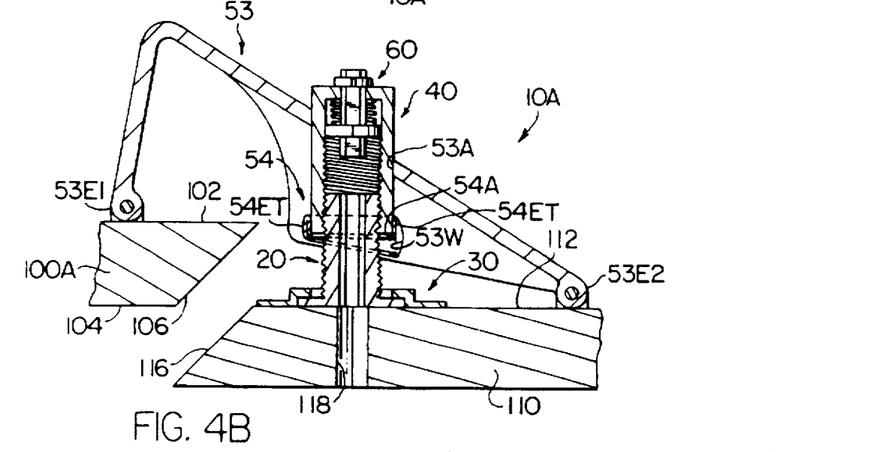
FIG. 4B is a cross-sectional view of the low profile latch mechanism of FIG. 4A in initial threaded engagement during the latch mechanism engagement procedure.
Figure 4C:
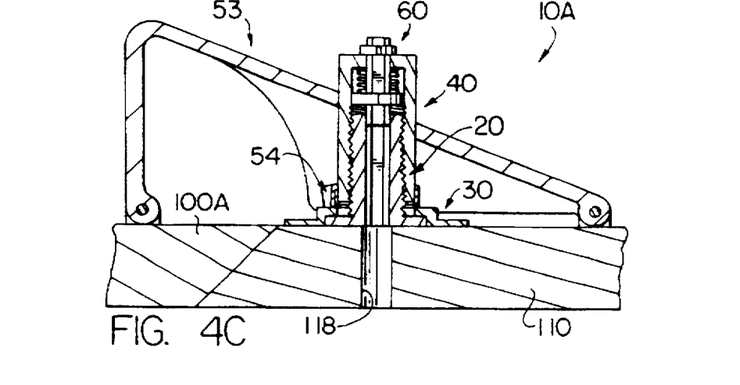
FIG. 4C is a cross-sectional view of the low profile latch mechanism of FIG. 4A in the engaged and locked state.

Another embodiment of a low profile latch mechanism 10A according to the present invention is exemplarily illustrated in FIGS. 4A, 4B, 4C. With reference to FIG. 4A, the latch mechanism 10A comprises the insert member 20, the insert mounting bracket 30, the captured floating nut 40, the safety lock member 60, and the removable key member 80 as described hereinabove. The insert member 20 and the insert mounting bracket 30 are disposed in combination with the internal surface 112 of the access panel 110, and the safety lock member 60 is disposed in combination with the captured floating nut 40 as described hereinabove.

The nut mounting means 50A for the latch mechanism 10A comprises a duplex hinge 53 and a positioning spring bracket 54. The positioning spring bracket 54 includes aligned apertures 54A, side tabs 54ST, and end tabs 54ET. The duplex hinge 53 includes an aperture 53A, opposed windows 53W, and first and second hinge ends 53E1, 53E2, respectively.

The captured floating nut 40 is mounted in combination with the positioning spring bracket 54 so that the side tabs 54ST and the end tabs 54ET thereof engage the corresponding edges of the torque shoulder 44 of the closed-end cylindrical member 42. The captured floating nut 40, positioning spring bracket 54 combination is mounted in combination with the duplex hinge 53 so that the side tab 54ST portions of the positioning spring bracket 54 protrude outwardly from the opposed windows 53W and the closed end of the cylindrical member 42 protrudes outwardly from the aperture 53A.

The first and second hinge ends 53E1, 53E2 are utilized to mount the duplex hinge 53 in pivoting combination with the airframe 100A and the access panel 110, respectively. With reference to FIGS. 4B, 4C, the first hinge end 53E1 is secured in hinged combination with the internal surface 102 of the airframe 100A and operative for pivoting motion with respect thereto. The second hinge end 53E2 is secured in hinged combination with the internal surface 112 of the access panel 110 and operative for pivoting motion with respect thereto.

The access panel 110 incorporating the embodiment of the low profile latch mechanism 10A described in the preceding paragraphs is opened and/or closed by a sequence of pivoting movements about the first and second ends 53E1, 53E2 of the duplex hinge 53. The net result of the sequence of pivoting movements is that the mating edge 116 is first displaced downwardly and away from the mating edge 106 of the airframe segment 106 and then swings outwardly with respect to the airframe segment 100A for opening of the access panel 110. The sequential displacement and pivoting motion of the access panel 110 as a result of the duplex hinge 53 is described in further detail in commonly-owned, copending U.S. patent application entitled AIRCRAFT DUPLEX DOOR HINGE ASSEMBLY (S-4566).

The procedure for engaging and disengaging the low profile latch mechanism 10A is the same as the procedure for the low profile latch mechanism 10 described hereinabove. The positioning spring bracket 54 is operative to automatically align the captured floating nut 40 for initial threaded engagement with the insert member 20 during the latch mechanism 10A engagement procedure. During the initial engagement, the positioning spring bracket 54 is in an un-compressed state as illustrated in FIG. 4B. With the low profile latch mechanism 10A in the engaged state, the positioning spring bracket 54 is in a fully compressed state as illustrated in FIG. 4C.

Figure 5A:
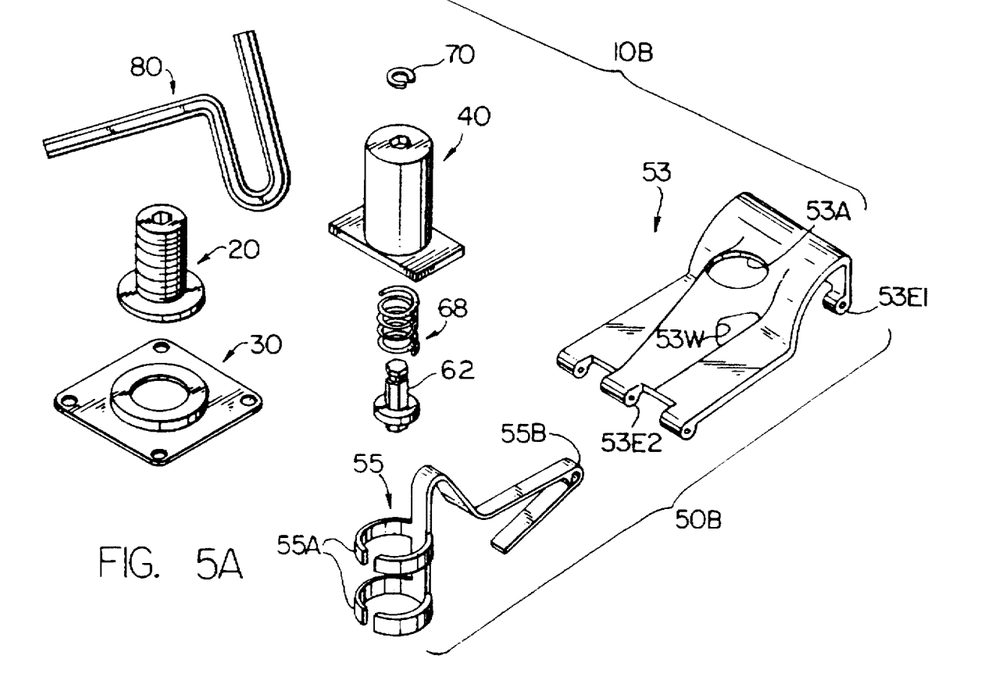
FIG. 5A is an exploded perspective view of a further embodiment of a low profile latch mechanism according to the present invention.
Figure 5B:
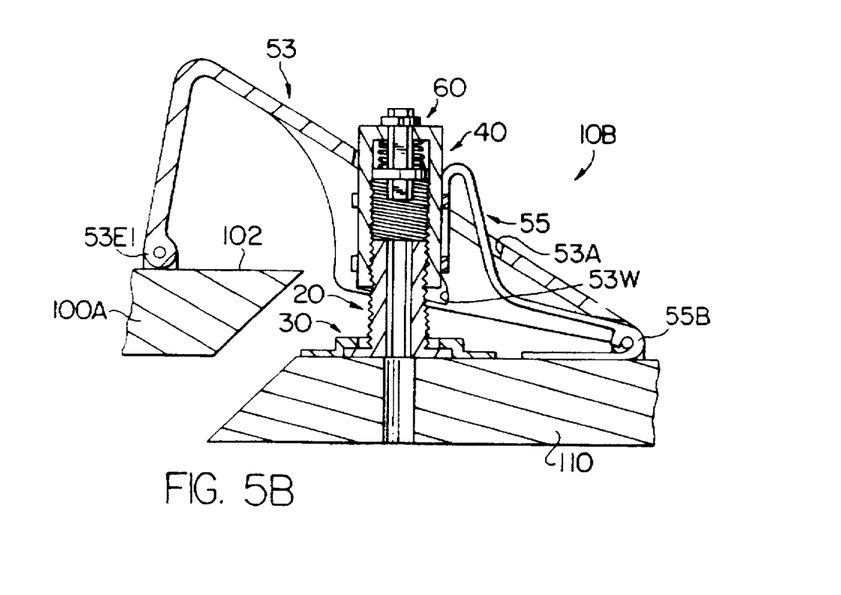
FIG. 5B is a cross-sectional view of the low profile latch mechanism of FIG. 5A in initial threaded engagement during the latch mechanism engagement procedure.
Figure 5C:
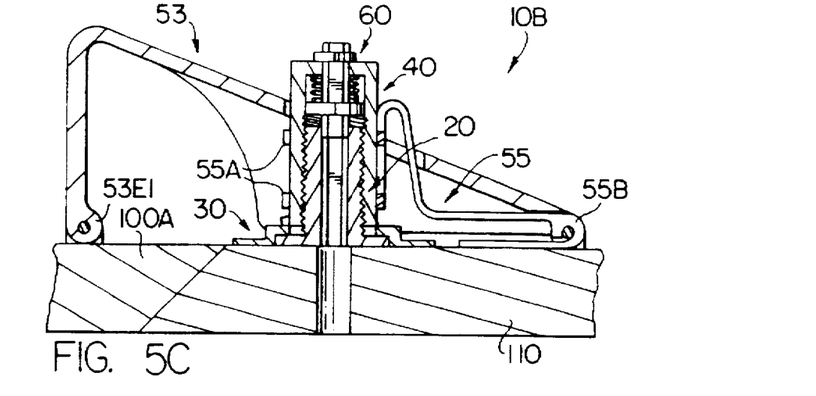
FIG. 5C is a cross-sectional view of the low profile latch mechanism of FIG. 5A in the engaged and locked state.

Yet a further embodiment of a low profile latch mechanism 10B is exemplarily illustrated in FIGS. 5A, 5B, 5C. The low profile latch mechanism 10B is functionally similar to the embodiment of the low profile latch mechanism 10A described in the preceding paragraphs inasmuch as the nut mounting means 50B of the latch mechanism 10B is operative to automatically align the captured floating nut 40 for initial threaded engagement with the insert member 20 during the latch mechanism 10B engagement procedure.

With reference to FIG. 5A, the latch mechanism 10B comprises the insert member 20, the insert mounting bracket 30, the captured floating nut 40, the safety lock member 60, and the removable key member 80 as described hereinabove. The insert member 20 and the insert mounting bracket 30 are disposed in combination with the internal surface 112 of the access panel 110, and the safety lock member 60 is disposed in combination with the captured floating nut 40 as described hereinabove.

The nut mounting means 50B for the latch mechanism 10B comprises the duplex hinge 53 described in the preceding paragraphs and a positioning spring member 55. The positioning spring member 55 includes upper and lower retainer clips 55A and a hinge end 55B. The duplex hinge 53 includes the aperture 53A, opposed windows 53W, and first and second hinge ends 53E1, 53E2, respectively.

The captured floating nut 40 is mounted in combination with the positioning spring member 55 utilizing the upper and lower retainer clips 55A thereof to mechanically engage the closed-end cylindrical member 42. The captured floating nut 40, positioning spring member 55 combination is mounted in combination with the duplex hinge 53 so that the closed-end of the cylindrical member 42 protrudes outwardly from the aperture 53A, the torque shoulder 44 protrudes outwardly from the opposed windows 53W, and the hinge end 55B is aligned with and pivotable in synchronization with the hinge end 53E2. The duplex hinge 53 is mounted in pivoting combination with the airframe 100A and the access panel 110, respectively, as described in the preceding paragraphs.

The procedure for engaging and disengaging the low profile latch mechanism 10B is the same as the procedure for the low profile latch mechanism 10 described hereinabove. The positioning spring member 55 is operative to automatically align the captured floating nut 40 for initial threaded engagement with the insert member 20 during the latch mechanism 10B engagement procedure. During the initial engagement, the positioning spring member 55 is in an un-compressed state as illustrated in FIG. 5B. With the low profile latch mechanism 10B in the engaged state, the positioning spring member 55 is in a fully compressed state as illustrated in FIG. 5C.

Figure 6A:
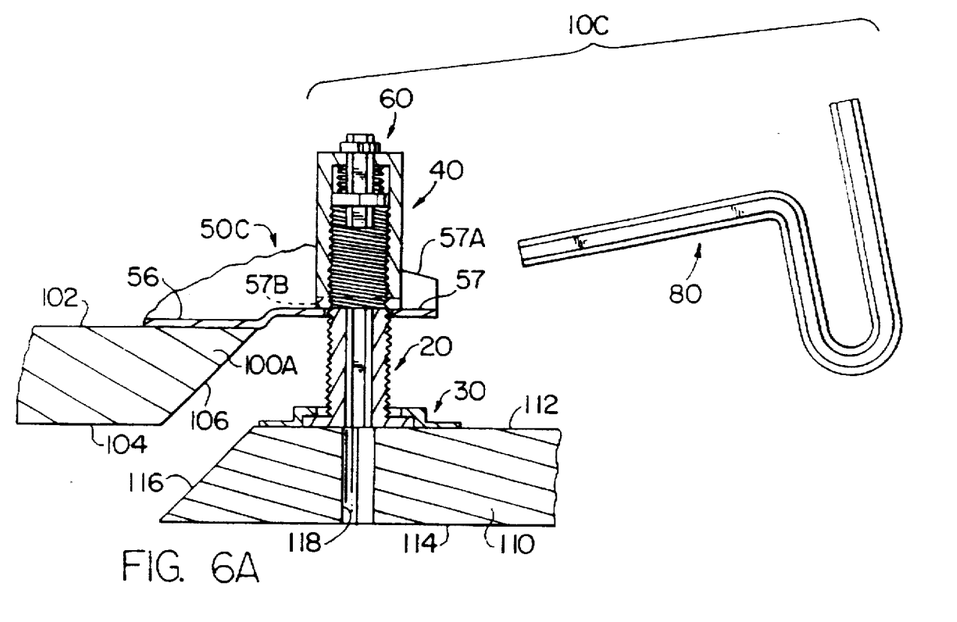
FIG. 6A is a cross-sectional view of yet a further embodiment of a low profile latch mechanism according to the present invention.
Figure 6B:
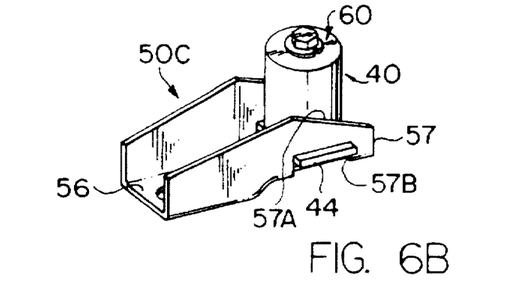
FIG. 6B is a perspective view of the captured floating nut and nut mounting means of the low profile latch mechanism of FIG. 6A in integrated combination.

Yet another embodiment of a low profile latch mechanism 10C according to the present invention is illustrated in FIGS. 6A, 6B. With reference to FIG. 6A, the latch mechanism 10C comprises the insert member 20, the insert mounting bracket 30, the captured floating nut 40, the safety lock member 60, and the removable key member 80 as described hereinabove. The insert member 20 and the insert mounting bracket 30 are disposed in combination with the internal surface 112 of the access panel 110, and the safety lock member 60 is disposed in combination with the captured floating nut 40 as described hereinabove.

The nut mounting means 50C for the latch mechanism 10C is illustrated in FIG. 6B and comprises a structural bracket having first and second ends 56, 57 that are utilized to mount the captured floating nut 40 in combination with the airframe 100A. The first end 56 is secured to the inner surface 102 of the airframe 100 by conventional means, e.g., screws. The second end 57 has a U-shaped configuration that includes a resilient tab 57A that defines opposed slots 57B (only one slot 57B is illustrated in FIG. 6B). The torque shoulder 44 of the captured floating nut 40 is inserted in the opposed slots 57B and engaged by the resilient tab 57A for mounting the capture floating nut 40 in nonrotatable combination with the airframe 10A. The procedure for engaging and disengaging the low profile latch mechanism 10A and for opening and closing the access panel 110 are the same as described for the embodiment of the low profile latch mechanism 10.

In addition to the features and advantages of the low profile latch mechanism according to the present invention described hereinabove, the latch mechanism provides a means for quickly verifying whether the latch mechanism is in the fully engaged and locked state. If the latch mechanism is not in the fully engaged state, a mismatch between the mating edges 106, 116 will be readily visible to the removable key member 80 operator. The mismatch condition may be accentuated by painting one or both of the mating edges 106, 116 a readily discernible color. The latch mechanism according to the present invention also provides a high mechanical advantage if the access panel design requires preloading.

A variety of modifications and variations of the present invention are possible in light of the above teachings. It is therefore to be understood that, within the scope of the appended claims, the present invention may be practiced otherwise than as specifically described hereinabove.

What is claimed is:

1. A low profile latch mechanism for an access panel defined by edges of a frame, the access panel being mounted in pivotable engagement with an adjacent segment of the frame, the frame having an inner surface and the access panel having mating edges complementary in configuration to the edges of the frame, an inner surface, an outer surface, and a minimal access aperture formed therethrough adjacent one mating edge thereof, comprising:

an externally threaded insert member having a polygonal-shaped internal channel extending therethrough;

an insert mounting bracket including a base plate secured in combination with the inner surface of the access panel and a cylindrical housing, said insert member being inserted in combination with the mounting bracket so that said insert member is restrained by said cylindrical housing and is rotatable with respect thereto and the internal surface of the access panel and said polygonal-shaped internal channel is aligned with the minimal access aperture of the access panel;

a captured floating nut having an internal cylindrical configuration, a first portion of said internal cylindrical configuration having threads and a second portion thereof having a smooth surface;

means for mounting said captured floating nut in nonrotatable combination with the inner surface of the frame;

a safety lock member having a polygonal-shaped body member disposed within said captured floating nut and operative for axial displacement with respect to said smooth surface of said second internal portion thereof, said polygonal shape of said body member being complementary to said polygonal shape of said internal channel; and a removable key member having a polygonal-shaped shank sized for insertion through the minimal access aperture of the access panel, said polygonal shape of said shank being complementary to said polygonal shape of said internal channel;

said low profile latch mechanism being engaged and locked to close the access panel by inserting said polygonal-shaped shank of said removable key member through the minimal access aperture to engage said polygonal-shaped internal channel, rotating said removable key member to thread said insert member into said captured floating nut while concomitantly axially displacing said safety lock member away from said insert member, and removing said removable key member upon full engagement of said insert member within said captured floating nut wherein said safety key member is axially displaced into mechanical engagement with said polygonal-shaped internal channel of said insert member to lock said low profile latch mechanism;

said low profile latch mechanism being unlocked and disengaged by inserting said polygonal-shaped shank of said removable key member through the minimal access aperture to mechanically disengage said safety key member from said polygonal-shaped internal channel of said insert member to unlock said low profile latch mechanism, counter-rotating said removable key member to threadingly disengage said insert member from said capture floating nut which causes the one mating edge of the access panel to be pushed outwardly from the frame, and removing said removable key member upon full disengagement of said insert member from said captured floating nut wherein the access panel may be manually opened.

2. The low profile latch mechanism of claim 1 wherein said safety lock member further comprises a centering member secured in combination with said polygonal-shaped body member and interacting with said smooth surface of said second internal portion of said captured floating nut to maintain said polygonal-shaped body member in coaxial alignment with said polygonal-shaped internal channel during axial displacement of said safety lock member.

3. The low profile latch mechanism of claim 1 wherein said captured floating nut comprises a closed-end cylindrical member having said internal cylindrical configuration, said closed-end cylindrical member having a torque shoulder at the open end thereof and a polygonal opening formed through said closed-end thereof.

4. The low profile latch mechanism of claim 3 wherein said safety lock member further comprises a centering member secured in combination with said polygonal-shaped body member and interacting with said smooth surface of said second internal portion of said captured floating nut to maintain said polygonal-shaped body member in coaxial alignment with said polygonal-shaped internal channel during axial displacement of said safety lock member;

a bias spring disposed in combination with said polygonal-shaped body member so as to be interposed between said closed-end of said cylindrical member and said centering member, said bias spring exerting a biasing force to cause axial displacement of said polygonal-shaped body member to mechanically engage said polygonal-shaped internal channel of said insert member;

a snap ring; and said polygonal-shaped body member having an annular groove formed therein, said polygonal-shaped body member extending through said polygonal opening of said captured floating nut so that said annular groove extends through said polygonal opening, said snap ring being inserted in said annular groove wherein said snap ring is operative to limit said axial displacement of said polygonal-shaped body member as a result of said biasing force by abutting against said closed end of said cylindrical member.

5. The low profile latch mechanism of claim 1 wherein said captured floating nut comprises a closed-end cylindrical member having said internal cylindrical configuration, said closed-end cylindrical member having a torque shoulder at the open end thereof, and wherein said mounting means for said captured floating nut comprises a bracket having first and second ends, said first end being utilized to secure said bracket in combination with the inner surface of the frame and said second end being utilized to engage said torque shoulder wherein said captured floating nut is mounted in nonrotatable combination with the frame.

6. The low profile latch mechanism of claim 1 wherein said captured floating nut comprises a closed-end cylindrical member having said internal cylindrical configuration, said closed-end cylindrical member having a torque shoulder at the open end thereof, and wherein said mounting means for said captured floating nut comprises a duplex hinge having an aperture, opposed windows, and first and second hinge ends mounted in pivoting combination with the frame and the access panel, respectively, and a positioning spring bracket having aligned apertures, side tabs, and end tabs, said captured floating nut being mounted in combination with said positioning spring bracket by means of said side and end tabs engaging said torque shoulder, said captured floating nut, positioning spring bracket combination being mounted in combination with said duplex hinge so that said end tabs protrude outwardly from said opposed windows and said closed end of said cylindrical member protrudes outwardly from said aperture, wherein said captured floating nut is mounted in nonrotatable combination with the frame.

7. The low profile latch mechanism of claim 1 wherein said captured floating nut comprises a closed-end cylindrical member having said internal cylindrical configuration, said closed-end cylindrical member having a torque shoulder at the open end thereof, and wherein said mounting means for said captured floating nut comprises a duplex hinge having an aperture, opposed windows, and first and second hinge ends mounted in pivoting combination with the frame and the access panel, respectively, and a positioning spring member having upper and lower retainer clips and a hinge end aligned with and pivotable in synchronization with said second hinge end of said duplex hinge, said captured floating nut being mounted in combination with said positioning spring member by means of said upper and lower retainer clips engaging said closed-end cylindrical member, said captured floating nut, positioning spring member combination being mounted in combination with said duplex hinge so that said torque shoulder protrudes outwardly from said opposed windows and said closed end of said cylindrical member protrudes outwardly from said aperture, wherein said captured floating nut is mounted in nonrotatable combination with the frame.

8. The low profile latch mechanism of claim 1 wherein said captured floating nut comprises a closed-end cylindrical member having said internal cylindrical configuration, said closed-end cylindrical member having a torque shoulder at the open end thereof, and wherein said mounting means for said captured floating nut comprises a structural bracket having a first end for securing said structural bracket in combination with the inner surface of the frame and a second end having resilient tabs engaging said torque shoulder of said close-end cylindrical member wherein said captured floating nut is mounted in nonrotatable combination with the frame.

9. The low profile latch mechanism of claim 1 wherein said externally threaded insert member includes a circular flanged head, said insert member being inserted in said cylindrical housing so that the threaded portion of said insert member protrudes outwardly from said cylindrical housing and said circular flanged head is restrained by said cylindrical housing and rotatably with respect thereto and the inner surface of the access panel.

10. A low profile latch mechanism for an aircraft access panel defined by edge segments of an airframe having an inner surface, the access panel being mounted in pivotable combination with the airframe, the access panel having mating edges complementary in configuration to the edge segments of the airframe, an inner surface, an outer surface, and a minimal access aperture formed therethrough adjacent one mating edge thereof, comprising:

an externally threaded insert member having a circular flanged head and a polygonal-shaped internal channel extending therethrough;

a mounting bracket having a cylindrical housing and a base plate for securing said mounting bracket in combination with the internal surface of the access panel, said insert member being inserted in said cylindrical housing so that the threaded portion of said insert member protrudes outwardly from said cylindrical housing and said circular flanged head is restrained by said cylindrical housing and rotatable with respect thereto and the inner surface of the access panel;

a captured floating nut including a closed-end cylindrical member having a torque shoulder at the open end thereof and a polygonal opening formed through the closed end thereof, said closed-end cylindrical member having an internal cylindrical configuration including a first portion having threads and a second portion having a smooth surface;

means for mounting said captured floating nut in nonrotatable combination with the inner surface of the airframe;

a safety lock member including a polygonal-shaped body member having an annular groove formed in one end thereof disposed within said captured floating nut and operative for axial displacement with respect to said smooth surface of said second portion thereof, a centering member secured in combination with said polygonal-shaped body member and interacting with said smooth surface of said second portion of said captured floating nut to maintain said polygonal-shaped body member in coaxial alignment with said polygonal-shaped internal channel during axial displacement of said safety lock member, a bias spring disposed in combination with said polygonal-shaped body member so as to be interposed between said closed-end of said cylindrical member and said centering member, said bias spring exerting a biasing force to cause axial displacement of said polygonal-shaped body member, and a snap ring, said polygonal-shaped body member extending through said polygonal opening of said captured floating nut so that said annular groove extends through said polygonal opening, said snap ring being inserted in said annular groove wherein said snap ring is operative to limit said axial displacement of said polygonal-shaped body member as a result of said biasing force by abutting against said closed end of said cylindrical member; and a removable key member having a polygonal-shaped shank sized for insertion through the minimal access aperture of the access panel;

said polygonal shape of said internal channel of said insert member, said polygonal shape of said body member, and said polygonal shape of said shank being complementary;

said low profile latch mechanism being engaged and locked to close the access panel by inserting said polygonal-shaped shank of said removable key member through the minimal access aperture to engage said polygonal-shaped internal channel, rotating said removable key member to thread said insert member into said captured floating nut while concomitantly axially displacing said safety lock member away from said insert member, and removing said removable key member upon full engagement of said insert member within said captured floating nut wherein said safety key member is axially displaced into mechanical engagement with said polygonal-shaped internal channel of said insert member to lock said low profile latch mechanism;

said low profile latch mechanism being unlocked and disengaged by inserting said polygonal-shaped shank of said removable key member through the minimal access aperture to mechanically disengage said safety key member from said polygonal-shaped internal channel of said insert member to unlock said low profile latch mechanism, counter-rotating said removable key member to threadingly disengage said insert member from said captured floating nut which causes the one mating edge of the access panel to be pushed outwardly from the frame, and removing said removable key member upon full disengagement of said insert member from said captured floating nut wherein the access panel may be manually opened.

11. The low profile latch mechanism of claim 10 wherein said mounting means for said captured floating nut comprises a bracket having first and second ends, said first end being utilized to secure said bracket in combination with the inner surface of the airframe and said second end being utilized to engage said torque shoulder wherein said captured floating nut is mounted in nonrotatable combination with the airframe.

12. The low profile latch mechanism of claim 10 wherein said mounting means for said captured floating nut comprises a duplex hinge having an aperture, opposed windows, and first and second hinge ends mounted in pivoting combination with the airframe and the access panel, respectively, and a positioning spring bracket having aligned apertures, side tabs, and end tabs, said captured floating nut being mounted in combination with said positioning spring bracket by means of said side and end tabs engaging said torque shoulder, said captured floating nut, positioning spring bracket combination being mounted in combination with said duplex hinge so that said end tabs protrude outwardly from said opposed windows and said closed end of said cylindrical member protrudes outwardly from said aperture, wherein said captured floating nut is mounted in nonrotatable combination with the airframe.

13. The low profile latch mechanism of claim 10 wherein said mounting means for said captured floating nut comprises a duplex hinge having an aperture, opposed windows, and first and second hinge ends mounted in pivoting combination with the frame and the access panel, respectively, and a positioning spring member having upper and lower retainer clips and a hinge end aligned with and pivotable in synchronization with said second hinge end of said duplex hinge, said captured floating nut being mounted in combination with said positioning spring member by means of said upper and lower retainer clips engaging said closed-end cylindrical member, said captured floating nut, positioning spring member combination being mounted in combination with said duplex hinge so that said torque shoulder protrudes outwardly from said opposed windows and said closed end of said cylindrical member protrudes outwardly from said aperture, wherein said captured floating nut is mounted in nonrotatable combination with the airframe.

14. The low profile latch mechanism of claim 10 wherein said mounting means for said captured floating nut comprises a structural bracket having a first end for securing said structural bracket in combination with the inner surface of the airframe and a second end having resilient tabs engaging said torque shoulder of said close-end cylindrical member wherein said captured floating nut is mounted in nonrotatable combination with the airframe.

* * * * *